United States Patent [19]

Morimoto et al.

[11] 4,288,046
[45] Sep. 8, 1981

[54] SPINNING REEL WITH ANTI-REVERSAL MECHANISM

[75] Inventors: Yoshinori Morimoto, Fuchu; Takehiro Kobayashi, Fukuyama, both of Japan

[73] Assignee: Ryobi, Ltd., Fuchu, Japan

[21] Appl. No.: 88,220

[22] Filed: Oct. 25, 1979

[30] Foreign Application Priority Data

Nov. 6, 1978 [JP] Japan .................. 53-153235

[51] Int. Cl.³ .................. A01K 89/01; F16D 63/00
[52] U.S. Cl. .................. 242/84.21 R; 74/577 S; 188/82.34
[58] Field of Search .................. 242/84.1 R, 84.21 R, 242/84.2 R, 84.51 A, 84.5 A; 188/82.3, 82.34; 74/577 R, 577 S, 577 M

[56] References Cited

U.S. PATENT DOCUMENTS

| 2,705,113 | 3/1955 | Bonanno | 242/84.21 R |
| 2,852,205 | 9/1958 | Beger | 242/84.21 R |
| 4,087,058 | 5/1978 | Yamasaki et al. | 242/84.51 A |
| 4,196,869 | 4/1980 | Shepherd | 242/84.21 R |

FOREIGN PATENT DOCUMENTS

| 2845119 | 5/1979 | Fed. Rep. of Germany ... 242/84.21 R |
| 1109402 | 9/1955 | France .................. 242/84.21 R |

Primary Examiner—Billy S. Taylor
Attorney, Agent, or Firm—Sughrue, Mion, Zinn, Macpeak and Seas

[57] ABSTRACT

A spinning reel having anti-reversal mechanism of simple and improved construction. The anti-reversal mechanism thereby provides a reversal rotation of a rotor because of the engagement between a ratchet gear and a stop pawl. This engagement can be released by a switching means which includes a depressing portion, position setting portion, shaft portion and a thumb lever, these being integrally formed. The switching means can be assembled to the reel body by inserting it from outside of the reel body.

7 Claims, 6 Drawing Figures

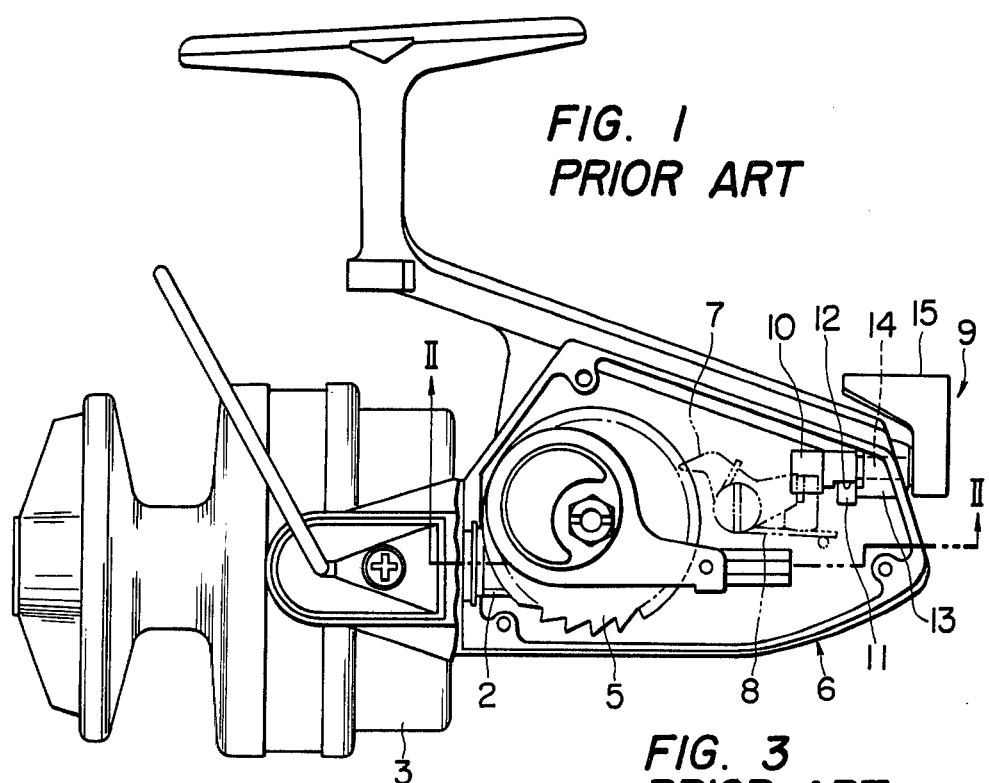
FIG. 1 PRIOR ART
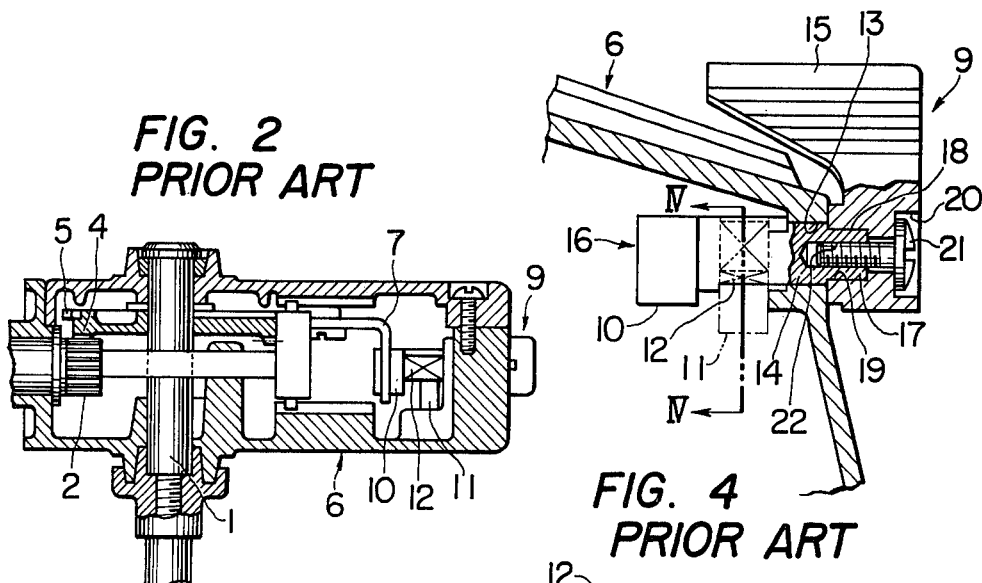
FIG. 2 PRIOR ART
FIG. 3 PRIOR ART
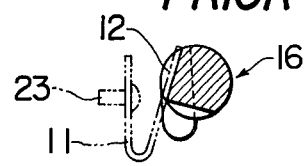
FIG. 4 PRIOR ART

SPINNING REEL WITH ANTI-REVERSAL MECHANISM

BACKGROUND OF THE INVENTION

This invention relates to a spinning reel having a reverse rotation preventing mechanism.

A conventional spinning reel having a reversal rotation preventing mechanism is shown in FIGS. 1 thru 4. Referring to FIGS. 1 and 2, a drive gear 4 is fixedly secured to a handle shaft 1 rotatable by a handle (not shown). The drive gear 4 is engaged with a pinion 2 connected to a rotor 3 to rotate same. The drive gear 4 integrally provides a ratchet gear 5 engageable with a ratchet pawl 7 pivotably mounted on a fishing reel body 6. One end of the ratchet pawl 7 normally engages the ratchet gear 5 by the biasing force of a spring 8.

Known is a switching means 9 which selectively controls the engagement between the ratchet gear and the ratchet pawl by a thumb lever 15 in order to permit the rotor 3 to rotate only in the fishing line rewinding direction to thus implement the anti-reversal function, or to permit the rotor to rotate in both rewinding and cocked directions. The switching means 9 includes a depressing portion 10 for urging the other end of the ratchet pawl 7, a position setting portion 12 for maintaining the above-mentioned engagement and disengagement between the ratchet gear 5 and the ratchet pawl 7, a shaft portion 14 rotatably supported by a bore 13 of the reel body 6 and the thumb lever 15.

The position setting portion 12 is in resilient contact with a free end of a U-shaped spring 11 whose other end is fixedly secured to the reel body 6 by a screw 23 (FIG. 4). The position setting portion is of generally cylindrical shape with two partially cut away flat surfaces adapted to be in surface engagement with the free end of the U-shaped spring 11 because of its urging force toward the portion 12. The surface engagement between the U-shaped spring with one of the flat surfaces of the position setting portion serves to maintain a first position of the depressing portion 10, while the surface engagement between the U-shaped spring 11 and the other flat surface serves to maintain the second position of the depressing portion, to thereby maintain engagement or disengagement of the ratchet pawl with the ratchet gear.

With this structure, the pivotal movement of the thumb lever 15 causes the depressing portion 10 to rotate about its axis to urge the other end of the ratchet pawl 7 against the biasing force of the spring 8, while the pivotal movement of the lever 15 is terminated and the lever is latched by the surface engagement between the U-shaped spring 11 and the position setting portion 12.

As best shown in FIG. 3, the depressing portion 10, the position setting portion 12 and the shaft portion 13 are integrally formed as a rod-like member 16, and the thumb lever 15 is separately provided. At outer end of the rod-like member a small diameter portion 18 is provided and is outwardly extended from the reel body 6 to provide a linking portion 17 adapted to be inserted into a corresponding cylindrical recess 19 formed in the thumb lever 15. The thumb lever 15 is further formed with a hole 20 in alignment with the cylindrical recess 19, and a screw 21 is inserted in the hole 20 and is threadingly engaged with a threaded hole 22 centrally formed in the shaft portion 14 to thus connect the rod-like member 16 to the thumb lever 15.

According to the conventional switching means 9, since the mass of the depressing portion 10 is large, the rod-like member 16 is inserted from the interior space of the reel body 6 into the cylindrical recess 19 of the thumb lever 15 during assembly. To be more specific, after the U-shaped spring 11 is secured to the reel body 6 by the screw 23, the rod-like member 16 is positioned in the reel body 6 and is inserted into the bore 13, so that the linking portion 17 is protruded therefrom to the outside of the reel body 6, to thus fit with the cylindrical recess 19 of the thumb lever 15. Thereafter, the thumb lever 15 is fixedly connected to the rod-like member 16 by the screw 21, so that the switching means 9 is supported on the reel body 6.

The above assembly work could be complicated and troublesome. Further, during assembly or disassembly, since the rod-like member 16 is attached or detached from the interior of the reel body, U-shaped spring 11, ratchet pawl 7 and the ratchet pawl spring 8 may be damaged, and furthermore, threading engagement between the screw 21 and the rod-like member 16 may be loosened or unfastened, to thereby deteriorate the fishing operation or lose the thumb lever 15. Moreover, since there are a lot of mechanical parts, production cost may be increased with complicated assembly work.

SUMMARY OF THE INVENTION

It is therefore, an object of this invention to overcome the above-mentioned drawbacks and to provide an improved anti-reversal mechanism.

Another object of this invention is to provide such mechanism capable of easy fabrication with low production cost.

Still another object of this invention is to provide such a mechanism capable of prevention of any damage to the associated U-shaped spring, ratchet pawl and ratchet pawl spring, to thus enhance durability and service life.

These and other objects of this invention are attained in accordance with this invention by providing an improved switching means. The switching means integrally provides the thumb lever and the shaft portion rotatably supported by a cylindrical bore formed in the reel body. The diameter of the rear end of the shaft portion which performs rotational movement with respect to the cylindrical bore is larger than that of the remaining portion thereof, so that the integral switching means can be detachably inserted from "outside" of the reel body into the cylindrical bore.

These and other objects of this invention will become apparent from the description of the drawings and the preferred embodiment which follows.

BRIEF DESCRIPTION OF THE DRAWINGS

In the drawings;

FIG. 1 shows a fragmentary illustration of the conventional spinning reel;

FIG. 2 shows a cross-sectional view taken along the line II—II of FIG. 1;

FIG. 3 shows a partially cross-sectional view of a switching means according to the conventional spinning reel;

FIG. 4 shows a cross-sectional view taken along the line IV—IV of FIG. 3;

DETAILED DESCRIPTION OF THE INVENTION

Figure 5:
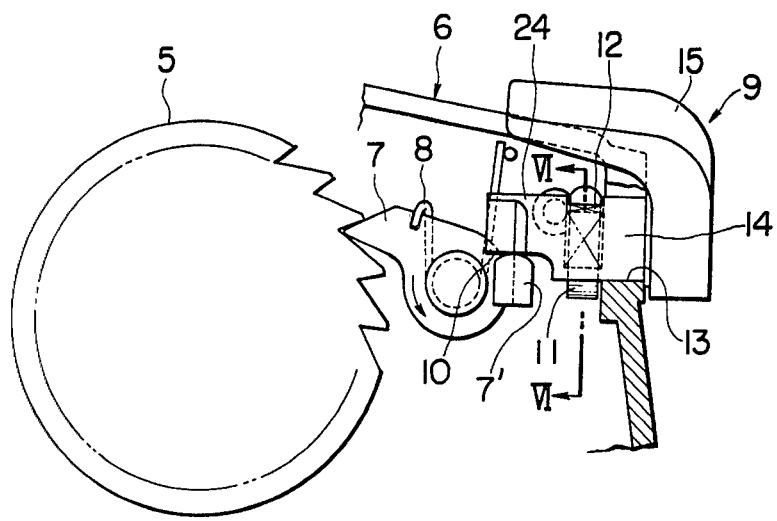
FIG. 5 shows a fragmentary illustration of the reverse rotation preventing mechanism according to the present invention; and, FIG. 6 shows a cross-sectional view taken along the line VI—VI of FIG. 5.
Figure 6:
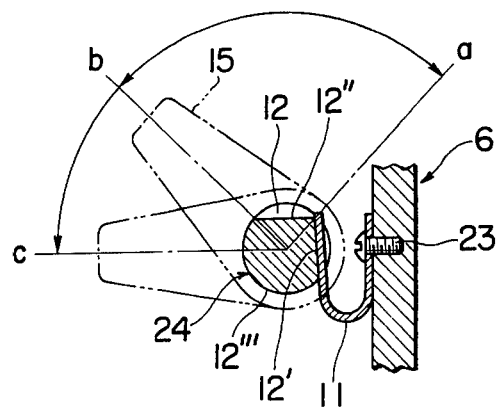

The reversal rotation preventing mechanism according to this invention is shown in FIGS. 5 and 6, wherein like parts and components are designated by the same reference numerals as those shown in FIGS. 1 to 4. In FIG. 5, a switching means 9 comprises a depressing portion 10 for pivoting a ratchet pawl 7 against the biasing force of a spring 8, a position setting portion 12 for maintaining the position of the ratchet pawl 7, a shaft portion 14 rotatably supported by a cylindrical bore 13 of a reel body 6, and a thumb lever portion 15 for discontinuously rotating the above mentioned portions 10,12, 14. According to this invention, these portions 10, 12, 14 and 15 are integrally formed of synthetic resin or metal.

The depressing portion 10 is provided at an inward end portion of a rod portion 24. The peripheral surface of the rod portion 24 is cut away which urges a post 7' of the ratchet pawl 7 downwardly in the drawing by the rotation thereof against the biasing force of the spring 8 to disengage the ratchet pawl 7 with the ratchet gear 5. The position setting portion 12 is provided at the position next to the depressing portion 10, and is provided with a stepped portion with which a U-shaped spring 11 secured to the reel body 6 by a screw 23 is fitted. The shaft portion provides the largest diameter, so that the switching means 9 can be inserted through the cylindrical bore 13 of the reel body 6 from outside of the reel body.

As best shown in FIG. 6, the position setting portion 12 has two flat cut-away surfaces 12',12". When the ratchet pawl 7 engages the ratchet gear 5 (anti-reverse position), the thumb lever 15 is at the position b, at which time one of the surfaces 12' of the position setting portion 12 is in surface engagement with the free end of the U-shaped spring 11. When the thumb lever 15 is shifted to a position a, the cut-away portion of the rod portion 24 urges the post 7' of the ratchet pawl 7 downwardly in the drawing against the biasing force of the spring 8, to thus disengage the ratchet pawl 7 from the ratchet gear 5, whereby the rotor can be freely rotated. In this case, the U-shaped spring 11 is in surface engagement with the other flat surface 12", so that the disengagement position can be maintained. In this connection, the biasing force of the U-shaped spring 11 must be larger than that of the spring 8.

If the thumb lever 15 is shifted to a position c, the U-shaped spring 11 is contacted with the arcuate surface 12'" of the position setting portion 12. Since the diameter of the arcuate portion is substantially equal to that of the shaft portion 14 as shown in FIG. 5, the switching means 9 can be detached from the reel body 6 in this position. On the other hand, during the surface engagement between the surfaces 12', or 12" and the U-shaped spring, since the surfaces 12', 12" are stepped whose axial width is substantially equal to the width of the U-shaped spring 11, and since the spring 11 is fixedly secured to the reel body 6, axial displacement of the switching means 9 can be prevented.

In view of the foregoing, according to this invention, since the depressing portion, position setting portion, shaft portion and thumb lever portion are provided integrally, and since the switching means can be detachably provided, mechanical parts can be minimized with low production cost. Further, since the switching means can be assembled from outside of the reel body, the assembly work can be easily carried out without damaging the U-shaped spring, ratchet pawl, and ratchet pawl spring, which are previously mounted in the reel body. Furthermore, even though the switching means can be easily inserted through the cylindrical bore with the arcuate portion of the position setting portion being in contact with the U-shaped spring, the switching means can be stably supported in the reel body upon the axial rotation of the position setting portion, since it provides a stepped recess adapted to be engaged with the U-shaped spring to avoid axial displacement of the switching means.

While the invention has been described in detail and with reference to the specific embodiment thereof, it will be apparent to one skilled in the art that various changes and modifications can be made therein without departing from the spirit and scope thereof.

What is claimed is:

1. In a spinning reel including a rotor, a reel body, a drive gear rotatably mounted in said reel body, a pinion gear engaged with said drive gear and connected to said rotor, an an anti-reversal mechanism which includes a ratchet gear integrally and coaxially provided with said drive gear, a stop pawl pivotally secured to said reel body and normally biased by a bias spring so as to engage said ratchet gear and prevent reverse rotation of said rotor, and switching means movable between at least a first position in which said pawl is permitted to engage said ratchet and a second position in which said pawl is held out of engagement with said ratchet, the improvement characterized in that said switching means comprises:

a depressing portion rotatable between a first position in which said pawl is permitted to engage said ratchet and a second position in which it holds said pawl out of engagement with said ratchet gear;

a position setting portion;

a shaft portion rotatably supported by said reel body;

a thumb lever for rotating said depressing portion; said thumb lever, shaft portion, position setting portion and depressing portion all being formed in a single integral rotatable member and the diameters of each of said depressing portion and position setting portion being no larger than the diameter of said shaft portion whereby said depressing portion and position setting portion can be inserted into said reel body from the outside thereof;

spring means fixedly secured to the interior of said reel body and engaging said position setting portion to maintain the rotational position of said depressing portion; and at least one indentation in the surface of said position setting portion and extending around less than the entire periphery of said position setting portion, said spring means being engagable with said indentation to prevent axial movement of said integral rotatable piece and thereby prevent disassembly of said single integral piece from said reel body, said spring means being disengagable from said indentation by rotation of said integral rotatable member to thereby permit removal of said integral rotatable member from the outside of said reel body.

2. A spinning reel as defined in claim 1, wherein said at least one indentation includes two flat surfaces engaged by said spring means at said first and second rotational positions of said depressing portion to thereby maintain said depressing portion in its first or second positions.

3. The spinning reel as defined in claim 2, wherein said two flat surfaces are adjacent one another around the periphery of said position setting portion.

4. The improvement of claim 3, wherein said position setting portion includes an arcuate surface between said two flat surfaces whose imaginary diameter is substantially equal to that of said shaft portion.

5. The improvement of claim 1, wherein the diameter of said shaft portion is larger than that of said depressing portion.

6. The improvement of claim 1, wherein said spring means comprises a U-shaped spring having one end fixedly secured to said reel body and the other end in engagement with said position setting portion.

7. The improvement of claim 1, wherein said depressing portion includes a cut-away portion for abutting said stop pawl in the second position of said depressing portion.

* * * * *